(12) United States Patent
Mao

(10) Patent No.: US 7,168,044 B1
(45) Date of Patent: Jan. 23, 2007

(54) APPARATUS AND METHOD FOR AUTOMATIC NETWORK CONNECTION PROVISIONING

(75) Inventor: Jim Mao, Rohnert Park, CA (US)

(73) Assignee: Turin Networks, Petaluma, CA (US)

( * ) Notice: Subject to any disclaimer, the term of this patent is extended or adjusted under 35 U.S.C. 154(b) by 281 days.

(21) Appl. No.: 09/745,983

(22) Filed: Dec. 22, 2000

(51) Int. Cl.
G06F 13/00 (2006.01)
H04L 12/28 (2006.01)

(52) U.S. Cl. .................... 715/736; 370/351
(58) Field of Classification Search ........... 345/735, 345/734, 736–739, 744, 771, 749, 705–714; 709/224, 226, 735, 736; 715/734–739, 853–854, 715/771–773, 964–970; 370/254–255, 351–430
See application file for complete search history.

(56) References Cited

U.S. PATENT DOCUMENTS

| | | | |
|---|---|---|---|
| 5,805,118 A * | 9/1998 | Mishra et al. ............ | 345/1 |
| 5,883,621 A * | 3/1999 | Iwamura ................. | 345/735 |
| 6,067,545 A * | 5/2000 | Wolff ..................... | 707/10 |
| 6,098,107 A * | 8/2000 | Narvaez-Guarnieri et al. ... | 709/239 |
| 6,199,030 B1 * | 3/2001 | Stone ..................... | 703/8 |
| 6,278,712 B1 * | 8/2001 | Takihiro et al. .......... | 370/400 |
| 6,339,488 B1 * | 1/2002 | Beshai et al. ............ | 398/59 |
| 6,370,154 B1 * | 4/2002 | Wickham ................. | 370/463 |
| 6,546,424 B1 * | 4/2003 | Cucchiara ............... | 709/226 |
| 6,564,258 B1 * | 5/2003 | Uniacke .................. | 709/223 |
| 6,574,669 B1 * | 6/2003 | Weaver ................... | 709/239 |
| 6,578,077 B1 * | 6/2003 | Rakoshitz et al. ......... | 709/224 |
| 6,658,000 B1 * | 12/2003 | Raciborski et al. ........ | 370/386 |
| 6,683,857 B2 * | 1/2004 | Maegawa ................. | 370/254 |
| 6,687,230 B1 * | 2/2004 | Furutono et al. .......... | 370/238 |
| 6,704,320 B1 * | 3/2004 | Narvaez et al. ........... | 370/408 |
| 6,763,325 B1 * | 7/2004 | Stone ..................... | 703/8 |
| 6,765,880 B1 * | 7/2004 | Hillard et al. ............ | 370/255 |
| 6,778,495 B1 * | 8/2004 | Blair ..................... | 370/230 |
| 6,785,260 B1 * | 8/2004 | Goyal et al. ............. | 370/351 |
| 6,810,422 B1 * | 10/2004 | Cross .................... | 709/227 |
| 6,976,087 B1 * | 12/2005 | Westfall et al. .......... | 709/238 |
| 7,006,431 B1 * | 2/2006 | Kanekar et al. .......... | 370/217 |
| 7,065,584 B1 * | 6/2006 | Shavitt et al. ............ | 709/241 |
| 2002/0006112 A1 * | 1/2002 | Jaber et al. .............. | 370/238 |
| 2003/0046390 A1 * | 3/2003 | Ball et al. ............... | 709/224 |
| 2005/0027845 A1 * | 2/2005 | Secor et al. ............. | 709/223 |
| 2005/0030896 A1 * | 2/2005 | Bahl et al. ............... | 370/231 |

OTHER PUBLICATIONS

Apostolopoulos, G., et al., "Server Based QOS Routing", pp. 762-768, Global Telecommunications Conference—Globecom, Dec. 1999, General Conference (Part B).

Apostolopoulos, G., et al., "Intradomain QoS Routing in IP Networks: A Feasibility and Cost/Benefit Analysis", pp. 42-54, IEEE Network, Sep./Oct. 1999.

(Continued)

Primary Examiner—Steven Sax
(74) Attorney, Agent, or Firm—Blakely, Sokoloff, Taylor & Zafman LLP

(57) ABSTRACT

A method is described that involves selecting a connection source and a connection destination from a graphical user interface that displays a topology of a network. Then, executing a routing algorithm to determine a path through the network. Then, provisioning the connection within the network that corresponds to the path.

20 Claims, 4 Drawing Sheets

OTHER PUBLICATIONS

Apostolopoulos, G., et al., "Quality of Service Based Routing: A Performance Perspective", pp. 17-28, ACM, 1998.

Key, P., et al., "Improving QoS Routing Performance Under Inaccurate Link State Information", pp. 1351-1362, ITC, vol. 3B, Jun. 1999.

Apostolopoulos, G., et al., "Implementation and Performance Measurements of QoS Routing Extensions to OSPF", pp. 680-688, IEEE Infocom, vol. 2, Mar. 1999.

Yu, C., "Access Controls for Open Architecture in Intelligent Networks", pp. 587-593, IEEE 1991.

Brennan, R., et al., "Evolutionary Trends in Intelligent Networks", pp. 86-93, IEEE Communications Magazine, Jun. 2000, vol. 38, No. 6.

Apostolopoulos, G., et al., "QoS Routing Mechanisms and OSPF Extensions", pp. 1-33, The Internet Society 1999, http://www.faqs.org/rfcs/rfc2676.html.

Wolter, C., "Optical Consortium Seeks Automatic Provisioning", pp. 1-3, XCHANGE, The Full Service Provider's Pipeline To success, Posted Mar. 2000, Virgo Publishing Inc. http://www.xchnagemag.com/articles/031work2.html.

Sycamore Networks, "360networks First to Deploy Worldwide Intelligent Optical Mesh Network With Sycamore's Intelligent Optical Switch", pp. 1-2, Jul. 7, 2000, http://www.360.net/News---Releases---Details.asp?ID=67.

Dehni, T, et al., Intelligent Networks and the HP OpenCall Technology, pp. 1-14, Hewlett-Packard Journal, Aug. 1997.

Apostolopoulos, G., et al., "Design and Implementation of QoS Routing Extensions to Gated OSPF with Interface to RSVP", pp. 1-32, Dec. 4, 1998.

* cited by examiner

APPARATUS AND METHOD FOR AUTOMATIC NETWORK CONNECTION PROVISIONING

FIELD OF THE INVENTION

The field of invention relates generally to networking management techniques; and more specifically, to a method an apparatus that automatically provisions a connection within a network.

BACKGROUND

FIG. 1 shows an exemplary network 100. A network 100 is implemented with a plurality of machines (referred to as a switches, routers, or nodes) interconnected by a plurality of links. For example, as seen in the exemplary network 100 of FIG. 1, nodes 101 through 109 are interconnected by links 111 through 125. A connection is a path through a network, such as path 126 seen in FIG. 1. A connection based network is a network that can send data from a source to a destination via a connection.

If a user of the network 100 desires to send information from a source A to a destination B, the connection 126 is first established through the network 100. Many different types of networking technologies employ connections in order to transport data. Connection based networking technologies include Asynchronous Transfer Mode (ATM), Multi-Protocol Label Switching (MPLS), Frame Relay, Synchronous Optical NETwork (SONET), and Wavelength Division Multiplexing (WDM) among others.

In many common circumstances, a user desires to establish a networking service relationship with a networking service provider (i.e., an entity or individual that offers the use of a network to a user). For example, a corporate user having an office at source A (e.g., New York City) may desire to send/receive information to/from another office at destination B (e.g., Chicago) over the course of business for the next calendar year.

A connection based service having defined characteristics as to the transportation of information between the source A and the destination B may be established by the service provider for the corporate user. For example, the service provider may guarantee that the network 100 will be able to accept an offered load of X Mb/s (or less) from the user at source A that will be delivered at the destination B with no more than Y seconds of end-to-end delay from the source A to the destination B.

The characteristics of the connection (e.g., the source/destination pair A/B, the path 126 through the network, the bandwidth allocation of X Mb/s at the source and the Quality of Service (QoS) of no more than Y seconds of delay across the network) are effectively stored by the service provider's network. When the corporate user attempts to send information from source A to destination B, the network 100 detects the attempt and establishes the connection according to its characteristics.

Connection provisioning is the configuring of a new connection into the repertoire of connections supported by a network. Connection provisioning involves determining: 1) the path for a connection; 2) the amount of the network's resources (e.g., bandwidth) used to support the connection; and 3) the storing of connection characteristics (e.g., a next hop node, switching or routing capacity resources to devote to the connection, etc.) into the nodes of the network so that the nodes can establish the connection when it is requested by the user.

A problem with connection provisioning is that it is manually intensive. That is, connections are currently provisioned into a network by manually entering next hop information into each node within the network that is used to support the connection. As a result, significant time is consumed from the moment a user is able to present characteristics of a desired connection (e.g., a source, a destination, a bandwidth, an in transit delay, etc.) to a service provider to the moment that the connection is configured into the network 100 so that it can establish such a connection afterward.

In related instances, significant time is also consumed trying to "bring-up" a network (e.g., from a nodal or other network system failure) because the connections have to be manually re-provisioned. In still other related instances, network connection provisions cannot be quickly adjusted to take advantage of changing networking conditions because the manual provisioning process is too cumbersome.

A method comprising selecting a connection source and a connection destination from a graphical user interface that displays a topology of a network. Then, executing a routing algorithm to determine a path through the network. Then, provisioning the connection within the network that corresponds to the path.

BRIEF DESCRIPTION OF THE DRAWINGS

The present invention is illustrated by way of example, and not limitation, in the Figures of the accompanying drawings in which.

DETAILED DESCRIPTION

A method is described that involves selecting a connection source and a connection destination from a graphical user interface that displays a topology of a network. Then, executing a routing algorithm to determine a path through the network. Then, provisioning the connection within the network that corresponds to the path.

A solution to the cumbersome manual connection provisioning process described in the background is an automatic connection provisioning process. That is, based upon a user's desired connection characteristics (e.g., source/destination pair, bandwidth and quality of service), the network itself is able to provision the connection into the network. In the discussion that follows, a centralized automatic network provisioning method and apparatus embodiment are first described followed by a distributed automatic network provisioning method and apparatus.

Figure 1:
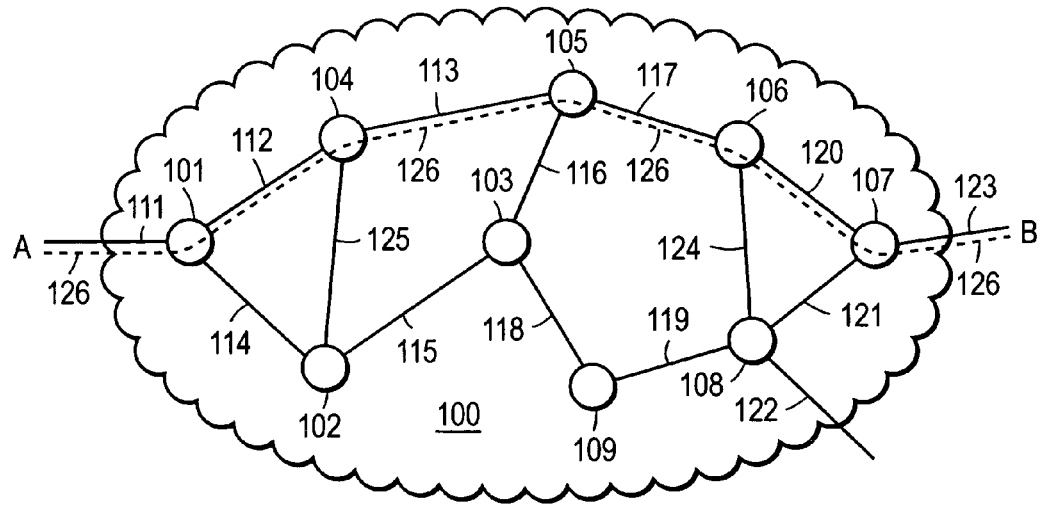
FIG. 1 shows a network topology.
Figure 2:
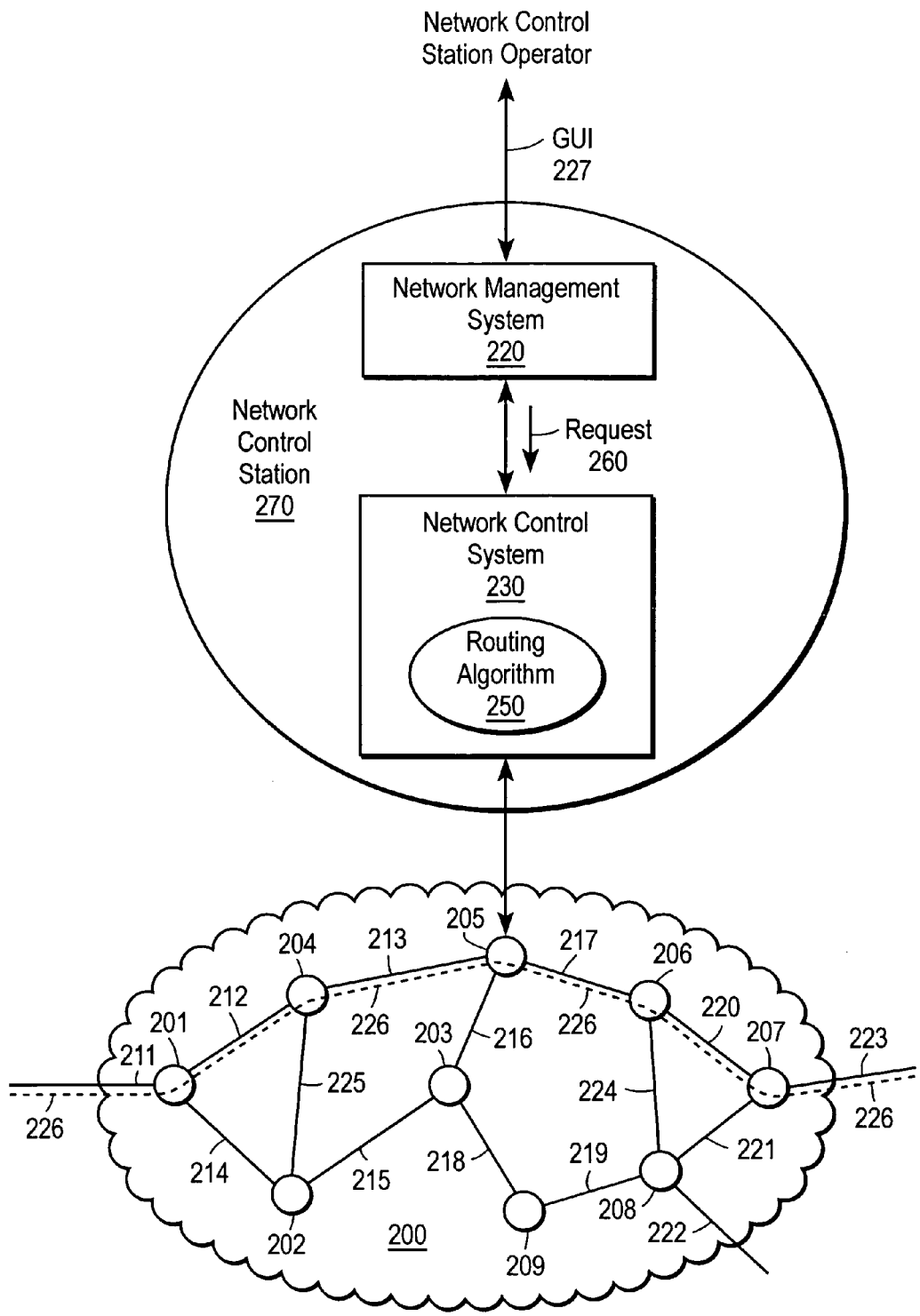
FIG. 2 shows a centralized, automatic connection provisioning approach.

FIG. 2 shows a network 200 having centralized automatic network provisioning capability. As developed in the description that follows, a routing algorithm 250 within a network control system 230 develops the appropriate path through the network 200 for a desired connection. The connection is then provisioned into the network 200 by the network control system 230.

Referring to FIG. 2, individuals responsible for maintaining the operation of a network 200 (also referred to as network control station operators) interact with a network through a network control station 270. A network control station 270 typically includes two components: a network management system 220 and a network control system 230. The network management system 220 acts as an interface between a network control station operator and the network control system 230.

A network control system 230 typically includes one or more software programs that collectively possess an understanding of the network's topology, resources, and the allocation of these resources. The network management system 220 presents the network control station operator with the understanding possessed by the network control system 230 (e.g., via a graphical user interface (GUI) 227).

A network's topology is a network's specific pattern of nodes and the links that exist between them. A network's resources are the switching or routing capacities of its nodes and the transmission capacities of its links. A network's resource allocation is a description of how its resources are organized (such as a listing of the connections provisioned into the network). Thus, for example, through the network management system 220 a network control station operator can view: 1) the location and capacity of each node (e.g., nodes 201 through 209); 2) the location and capacity of each link (e.g., links 211 through 225); and 3) the connections provisioned into the network.

The network control system 230 is shown coupled to the network 200. The network control system 230 sends control messages into the network 200 to control the resources of the network 200 and also receives control messages from the network 200 to monitor the resources of the network 200. For example, in various embodiments, the network control system 230 can forward to each access node (though one or more control messages) the amount of routing capacity it should devote to each connection it interfaces to a user with (e.g., either at the source of a connection or at the destination of a connection). An access node is a point of entry or exit from a network (such as nodes 201 and 207 as seen in FIG. 2).

If a new connection is to be provisioned into the network (e.g., that follows path 226 seen in FIG. 2), look up tables within the nodes used to carry the connection (e.g., nodes 201, 204, 205, 206, 207) are typically updated so that packets, cells, time slots (or perhaps other data structures) may be properly passed from a receiving node to a next node according to the connection path 226. Other information associated with the connection may also be stored into the nodes used to carry the connection such as the amount of switching resources a node is to devote to the connection or the priority of the connection (so that its information may be routed sooner rather than later through the node).

Thus the network control system 230, in order to provision the new connection within the network 200, may send to one or more control messages into the network 200 that effectively command the network nodes to update their look up tables (or other databases) accordingly. The network control system 230 also collects control messages sent from the network 200 that indicate various network events (e.g., a link shutdown or a node shutdown) or traffic statistics.

The control messages sent between the network control system 230 and the network 200 may correspond to a networking management protocol such as SNMP, MPLS, LSP, RSVP, or other technique for communicating between a network control station 270 and a network 200.

As discussed in the background, the process of connection provisioning is traditionally a manual process. That is, for example, a network control station operator manually informs the network control system 230 (through the network management system 220) of the routing path that a connection is to possess as well as the resources that are to be allocated for the connection. These specific instructions are then converted into control messages by the network control system 230 and sent into the network 200.

In the centralized automatic networking provision approach of FIG. 2, however, characteristics of a new connection are presented to the network management system 220 by the network control station operator. In an embodiment, these characteristics include information indicative of the source/destination pair of the connection, a minimum and/or maximum bandwidth to be supported by the connection at its source (e.g., X Mb/s), a minimum and/or maximum bandwidth to be supported by the connection at its destination, one or more quality of service (QoS) parameters (such as end-to-end delay, jitter, etc.).

The generation of these characteristics may be enhanced by a graphical user interface 227. For example, a topology of the network (note an exemplary network topology 200 is shown in FIG. 2) may be visually presented to the network control station operator as part of the functionality of the network management system 230. The graphical interface 227 may be configured to show the topology of the network (i.e., the nodes of the network as well as the links of that interconnect them). The network control station operator, by pointing and clicking at a source and a destination can automatically generate the source/destination pair characteristics of the connection.

Furthermore, the graphical user interface 227 may prompt the network administrator (e.g., via a pop up window or form, etc.) for additional connection characteristics such as: 1) the networking technology employed at the source and/or destination access nodes (e.g., Asynchronous Transfer Mode (ATM), Multi-Protocol Label Switching (MPLS), Frame Relay (FR), Time Division Multiplexing (TDM), Synchronous Optical NETtwork (SONET), and Wavelength Division Multiplexing (WDM) among others, etc.); and 2) the bandwidth allocation at the source access node and/or the destination access nodes. The network characteristics may also include various QoS parameters such as: 1) the end to end delay across the connection; 2) the jitter in the connection; 3) the error rate; etc.

Upon the selection of the source/destination points (and perhaps the entry of additional network characteristics) through the graphical user interface 227, a set of connection characteristics that describe the connection are generated and sent as a request 260 to the network control system 230. In the centralized, automatic networking provisioning approach of FIG. 2, the network control system 230 includes a routing algorithm 250 that determines a best path through the network 200.

A routing algorithm (e.g., Routing Information Protocol (RIP), Open Shortest Path First (OSPF), derivatives of these, etc.) is an algorithm that determines an end to end best path through a network 200. In an embodiment, the routing algorithm 250 has bandwidth and/or QoS based routing extensions. A routing algorithm having bandwidth and/or QoS based routing extensions not only keeps track of topology information but also keeps track of bandwidth and/or QoS related information.

As such, the best routing path through the network is based upon the resources of the network (in the form of nodal switching/routing capacity and link speed) rather than simply counting the fewest number of nodal hops (as is the case with traditional routing algorithms). For example, in a source routing approach (such as OSPF) having bandwidth and QoS extensions, weights may be given to each link and node within the network 200 that reflect the available resources at the node or link.

The weight of a node or link may increase as the resources become constrained and decrease as resources become available. As such, the best path through the network corresponds to the combination of nodes and links having the lowest combined weight from the source access node to the destination access node. Note that the routing algorithm may have sufficient granularity to understand the resources available for each networking technology (e.g., ATM, MPLS, FR, TDM etc.). For example, a separate weight may be tracked for each networking technology employed.

Based upon the path determined by the routing algorithm, the network control system 230 can also determine the effect that the proposed connection may have on the performance of other connections (e.g., in the form of additional delay associated with the nodes used to transport the proposed connection).

If the network can support the proposed connection (e.g., by comparing the bandwidth and/or QoS requirements of the proposed connection defined by the request 260 against those associated with the best path determined by the routing algorithm) and if implementing the proposed connection does drop the performance of other connections beneath their minimum allowable performance level (e.g., with respect to their individual bandwidth and QoS requirements), the proposed connection is provisioned into the network.

That is, the request 260 is answered affirmatively. The network control system 230 then sends appropriate control messages into the network 200 that effectively provision the connection. If the network cannot support the proposed connection or its implementation will unacceptably affect the other connections supported by the network, the request 260 is answered negatively.

In an alternate embodiment, the routing algorithm 250 determines the two best paths through the network 200. The pair of best paths are then provisioned into the network 200 where one of the paths is a redundant path. As an example, either 1+1 redundancy or 1:1 redundancy may be implemented. In the case of 1+1 redundancy both paths are simultaneously used in parallel. That is, the information in the connection is simultaneously sent twice along two different paths in the network 200. In the case of 1+1 redundancy, the redundant path is used only if the other path is not operable (e.g., because of a link failure along the path route).

Figure 3:
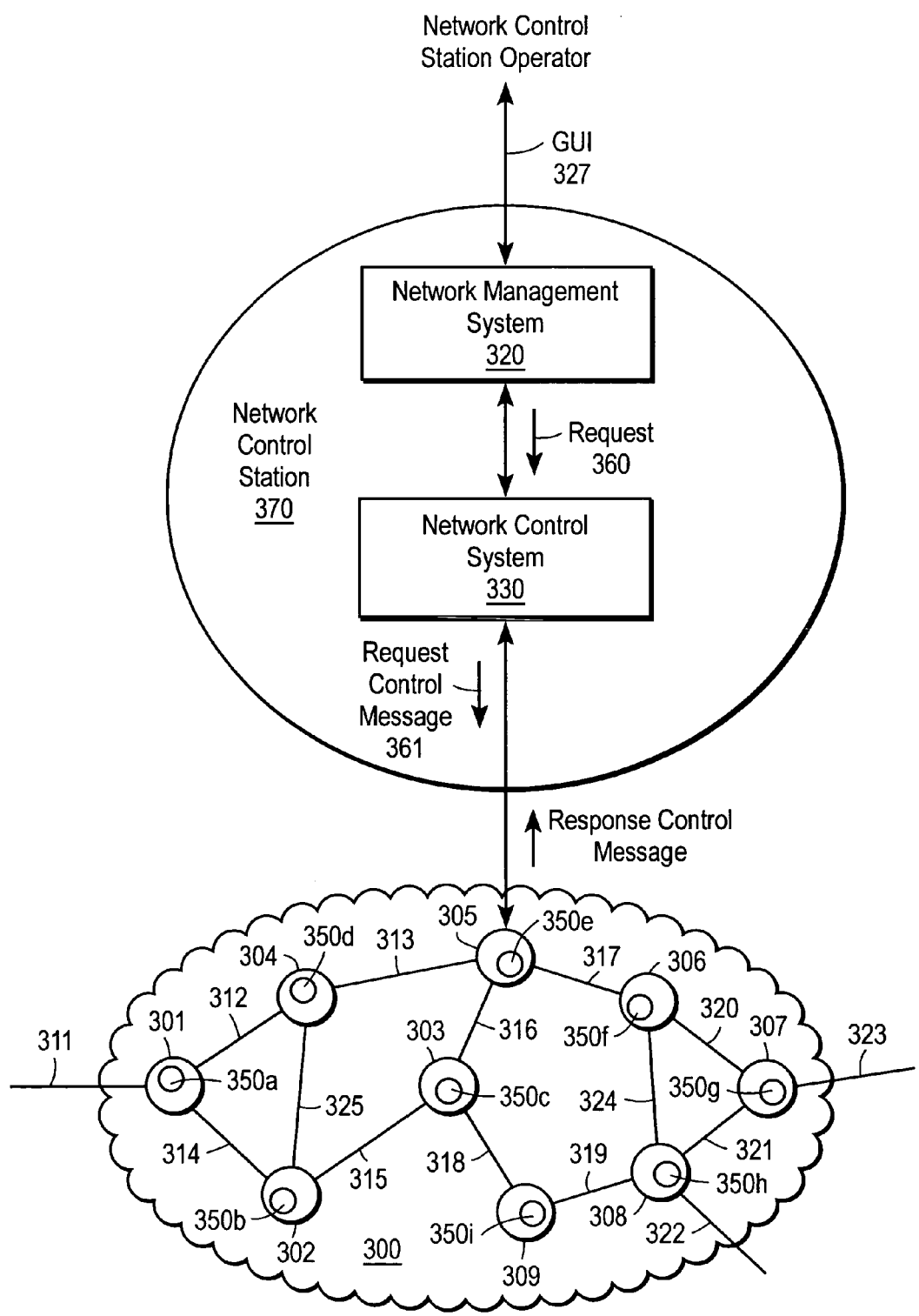
FIG. 3 shows a distributed, automatic connection provisioning approach.

FIG. 3 shows an alternate embodiment in which the routing algorithm is distributed over each of the nodes 301 through 310 in the network 300. That is, whereas the centralized approach of FIG. 2 isolates within the network control system 230 the determination of the best path through the network 200; the distributed approach of FIG. 3 uses routing algorithms 350a through 350i installed on each node 301 through 309 in the network.

The characteristics of the user's proposed connection are passed from the network management system 320 to the network control system 330 (in the form of a request 360) as discussed above with respect to the approach of FIG. 2. In the distributed approach of FIG. 3, the request 360 is translated into a request control message 361 that is sent from the network control system 330 into the network 300. The request associated with the request control message 361 is then effectively passed to each node in the network (or at least each node that would be used to carry the connection).

In a distributed routing algorithm approach, the nodes 301 through 309 in the network 300 exchange information that reflect the topology of the network 300. Based on the exchanged topology information, each network node 301 through 309 is able to develop an understanding of the topology of the network 300. Furthermore, the exchanged information may also include bandwidth and/or QoS related information.

As such, a routing algorithm having bandwidth and/or QoS extensions may be executed on each node 301 or 309. Based upon its understanding of the topology and resource contraints of the entire network (as described above with respect to the routing algorithm 250 of FIG. 2), each node can determine the best path through the network for a proposed connection and therefore determine which node is the appropriate "next node" for the connection (for those nodes the best path happens to flow through).

Each of the nodes that will be used to carry the proposed connection respond to the request control message 361 with a response control message that indicates whether or not the node has sufficient resources to entertain the connection and if so, the delay or other resource constraints that may impair the performance of other connections already supported by the network.

After collecting the response control messages, the network control system 330 decides whether or not the connection should be provisioned for. If so, the request 360 is answered affirmatively and a control message is sent into the network 300. The look up tables of the affected nodes are updated accordingly. Similar to the approach of FIG. 2, redundant connection paths may also be configured of at least two paths are determined by the distributed routing algorithms 350a through 350j.

Figure 4:
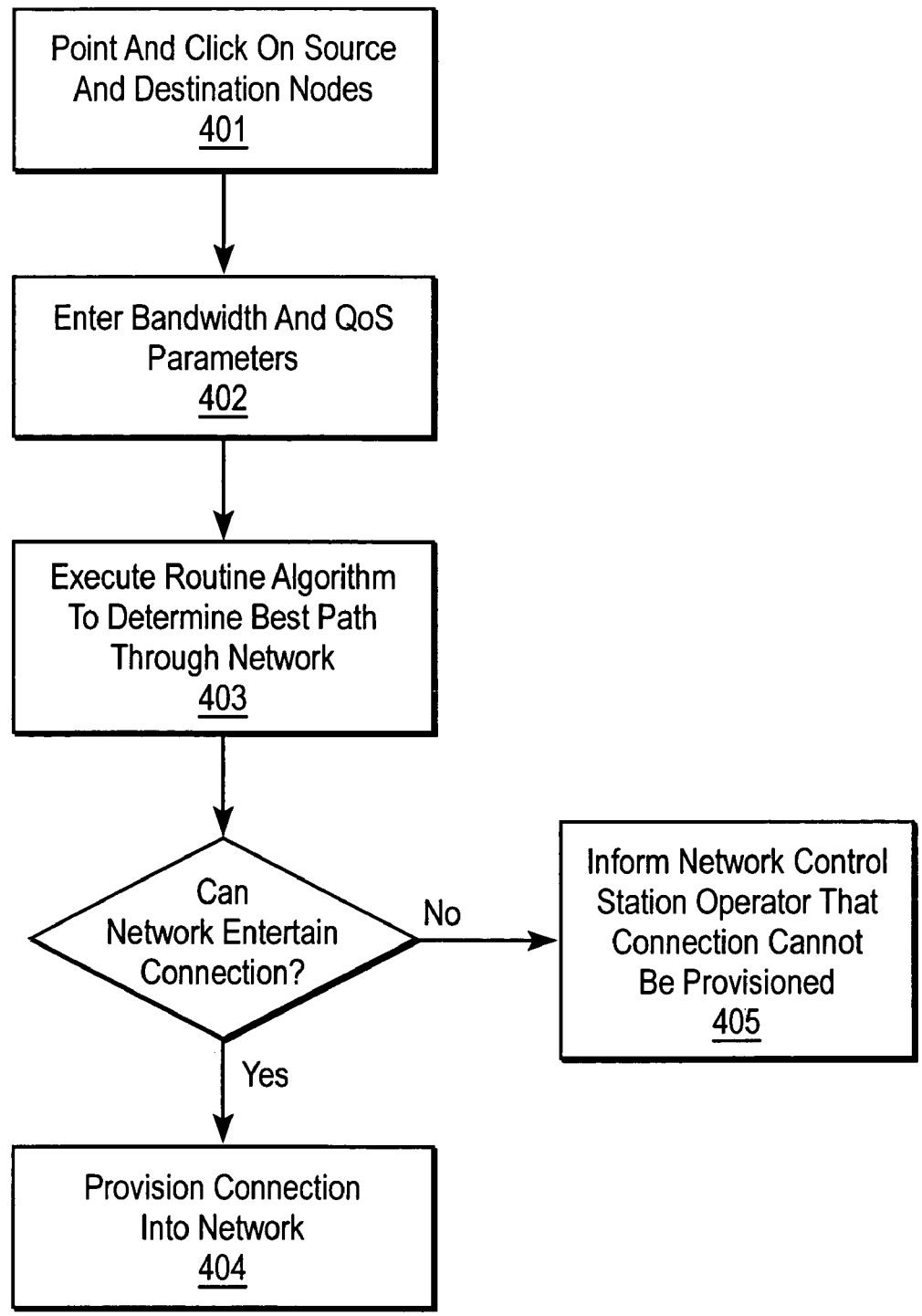
FIG. 4 show a methodology used to automatically provision for a network connection.

FIG. 4 shows a methodology that describes the operation of the centralized and distributed automatic provisioning approaches discussed above. A source and destination node are selected 401 (e.g., by pointing and clicking) from a network topology presented to a network control station operator by a graphical user interface.

Then, additional characteristics to be associated with the connection (e.g., bandwidth and/or QoS parameters) are selected or otherwise entered 402 (e.g., via a form or pop up menu). These characteristics are then made available to a routing algorithm having bandwidth and/or QoS routing extensions.

The routing algorithm having bandwidth and/or QoS extensions is then executed 403 to determine the best path through the network from the source to the destination. If the network can entertain the connection it is provisioned 404 into the network, otherwise the network control station operator is informed 405 that the proposed connection cannot be provisioned.

Because the routing algorithms, network management systems and network control systems discussed above may be implemented at least partially with a software, it is to be understood that embodiments of this invention may be used as or to support software programs executed upon some form of processing core (such as the CPU of a computer) or otherwise implemented or realized upon or within a machine readable medium.

A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    displaying a graphical user interface that allows a user to select, from a representation of a network that is presented on a graphical user interface, a first connection endpoint that is associated with a first access node of the network and a second connection endpoint that is associated with a second access node of the network;
    executing a routing algorithm to determine a path through the network amongst a plurality of possible paths through the network, the path and the possible paths each connecting the first connection endpoint and the second connection endpoint, the executing comprising:
        assigning respective weights to links and nodes within the network, each weight of each link and each node representing resources available for each link and each node, wherein a weight of a link increases if the resources available from the link decreases or vice versa, wherein a weight of a node increases if the resources available from the node decreases or vice versa;
        changing the weights of each link and each node according to availability of resources of each link and each node;
        determining that the path has the lowest combined weight from the first connection endpoint to the second connection endpoint, including weights of links and nodes between the first connection endpoint and the second connection endpoint; and,
    provisioning a connection within the network that corresponds to the path, the provisioning comprising updating information held within a node that resides within the network and that resides along the path.

2. The method of claim 1 wherein the executing a routing algorithm further comprises executing a distributed routing algorithm -within nodes of the network.

3. The method of claim 2 wherein the executing a distributed routing algorithm further comprises sending topology information from a first node to a second node within the network.

4. The method of claim 2 wherein the executing a distributed routing algorithm further comprises sending bandwidth resource information from a first node to a second node within the network.

5. The method of claim 2 wherein the executing a distributed routing algorithm further comprises sending Quality of Service (QoS) information from a first node to a second node within the network.

6. The method of claim 1 wherein the executing a routing algorithm further comprises executing the routing algorithm at a network control management system that is coupled to the network.

7. The method of claim 1 wherein the graphical user interface allows the user to choose a bandwidth for the connection.

8. The method of claim 7 wherein the graphical user interface allows the user to choose at least one Quality of Service (QoS) parameter for the connection.

9. The method of claim 8 wherein the at least one QOS parameter further comprises end-to-end transit delay for the connection.

10. The method of claim 8 wherein the at least one QoS parameter further comprises jitter.

11. A machine readable medium having instructions stored thereon that when executed by one or more processors cause the one or more processors to perform a method, the method comprising:
    displaying a graphical user interface that allows a user to select, from a representation of a network that is displayed on the graphical user interface, a first connection endpoint that is associated with a first access node of the network and a second connection endpoint that is associated with a second access node of the network; and,
    causing a routing algorithm to be executed and a connection to be provisioned, the routing algorithm being executed to determine a path through the network amongst a plurality of possible paths through the network, the path and the possible paths each connecting the first connection endpoint and the second connection endpoint, the connection being provisioned within the network by updating information within a node that resides within the network and that resides along the path, the connection corresponding to the path, the executing comprising:
        assigning respective weights to links and nodes within the network, each weight of each link and each node representing resources available for each link and each node, wherein a weight of a link increases if the resources available from the link decreases or vice versa, wherein a weight of a node increases if the resources available from the node decreases or vice versa;
        changing the weights of each link and each node according to availability of resources of each link and each node;
        determining that the path has the lowest combined weight from the first connection endpoint to the second connection endpoint, including weights of links and nodes between the first connection endpoint and the second connection endpoint.

12. The machine readable medium of claim 11 wherein the routing algorithm is a distributed routing algorithm.

13. The machine readable medium of claim 12 wherein the distributed routing algorithm is designed to send topology information from a first node to a second node within the network.

14. The machine readable medium of claim 12 wherein the distributed routing algorithm is designed to send bandwidth resource information from a first node to a second node within the network.

15. The machine readable medium of claim 12 wherein the distributed routing algorithm is designed to send Quality of Service (Qos) information from a first node to a second node within the network.

16. The machine readable medium of claim 11 further comprising instructions which when executed cause the one or more processors to execute the routing algorithm at a network control management system coupled to the network.

17. The machine readable medium of claim 11 wherein the graphical user interface allows the user to choose a bandwidth for the connection.

18. The machine readable medium of claim 17 wherein the graphical user interface allows the user to choose at least one Quality of Service (QoS) parameter for the connection.

19. The machine readable medium of claim 18 wherein the at least one QOS parameter further comprises end-to-end transit delay for the connection.

20. The machine readable medium of claim 18 wherein the at least one QoS parameter further comprises jitter.

\* \* \* \* \*